US012641129B2

(12) United States Patent
Lancioni et al.

(10) Patent No.: US 12,641,129 B2
(45) Date of Patent: May 26, 2026

(54) METHODS AND APPARATUS TO IMPROVE THE EFFICIENCY OF AN ARTIFICIAL INTELLIGENCE-BASED THREAT DETECTION MODEL

(71) Applicant: McAfee, LLC, San Jose, CA (US)

(72) Inventors: German Lancioni, San Jose, CA (US); Eric Wuehler, Beaverton, OR (US)

(73) Assignee: McAfee, LLC, San Jose, CA (US)

( * ) Notice: Subject to any disclaimer, the term of this patent is extended or adjusted under 35 U.S.C. 154(b) by 51 days.

(21) Appl. No.: 18/909,665

(22) Filed: Oct. 8, 2024

(65) Prior Publication Data

US 2026/0100974 A1     Apr. 9, 2026

(51) Int. Cl.
*H04L 9/40* (2022.01)
*H04L 41/16* (2022.01)
(52) U.S. Cl.
CPC .............. *H04L 63/20* (2013.01); *H04L 41/16* (2013.01); *H04L 63/0236* (2013.01)
(58) Field of Classification Search
CPC ...... H04L 63/20; H04L 41/16; H04L 63/0236
See application file for complete search history.

(56) References Cited

U.S. PATENT DOCUMENTS

2025/0184350 A1* 6/2025 Gleitz ................... G06F 21/577
2025/0267161 A1* 8/2025 Greevy .............. H04L 63/1441

OTHER PUBLICATIONS

Twilio Inc., "Twilio SendGrid Docs—Everything about DMARC," 2025, 10 pages.
Dmarcian, "Understanding Gmail and Yahoo DMARC Requirements," retrieved from https://dmarcian.com/yahoo-and-google-dmarc-required/, Jan. 2, 2024, 11 pages.

* cited by examiner

*Primary Examiner* — Huan V Doan
(74) *Attorney, Agent, or Firm* — Hanley, Flight & Zimmerman LLC

(57) ABSTRACT

Systems, apparatus, articles of manufacture, and methods are disclosed to improve the efficiency of an artificial intelligence-based threat detection model. An example apparatus includes interface circuitry, machine readable instructions, and programmable circuitry to at least one of instantiate or execute the machine readable instructions to: obtain an email address from a group of email addresses to be considered as candidates for adding to the list of non-suspicious email addresses, determine that a domain of the email address is indicative of a non-email service providing entity, determine that the email address has a policy configured for a domain-based message authentication, reporting, and conformance (DMARC) record, add the email address associated to the list of non-suspicious email addresses, and cause the artificial intelligence-based threat detection model to skip an analysis of an email associated with the email address.

20 Claims, 9 Drawing Sheets

METHODS AND APPARATUS TO IMPROVE THE EFFICIENCY OF AN ARTIFICIAL INTELLIGENCE-BASED THREAT DETECTION MODEL

FIELD OF THE DISCLOSURE

This disclosure relates generally to artificial intelligence-based threat detection models and, more particularly, to methods and apparatus to improve the efficiency of an artificial intelligence-based threat detection model.

BACKGROUND

Artificial intelligence is becoming an important component of leading-edge computer security products. For example, neural networks and other machine learning algorithms allow such computer security products to scan and detect zero-day threats, such as phishing, malware, and other types of scams, which may be undetectable by at least some prior threat detection solutions. Artificial intelligence is specifically useful in email-based threats, which are a common method of attack that most users suffer daily.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
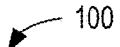
FIG. 1 is a block diagram of an example security environment in which an example non-suspicious list generation circuitry operates to identify domains of email addresses that are not suspicious.
Figure 1:
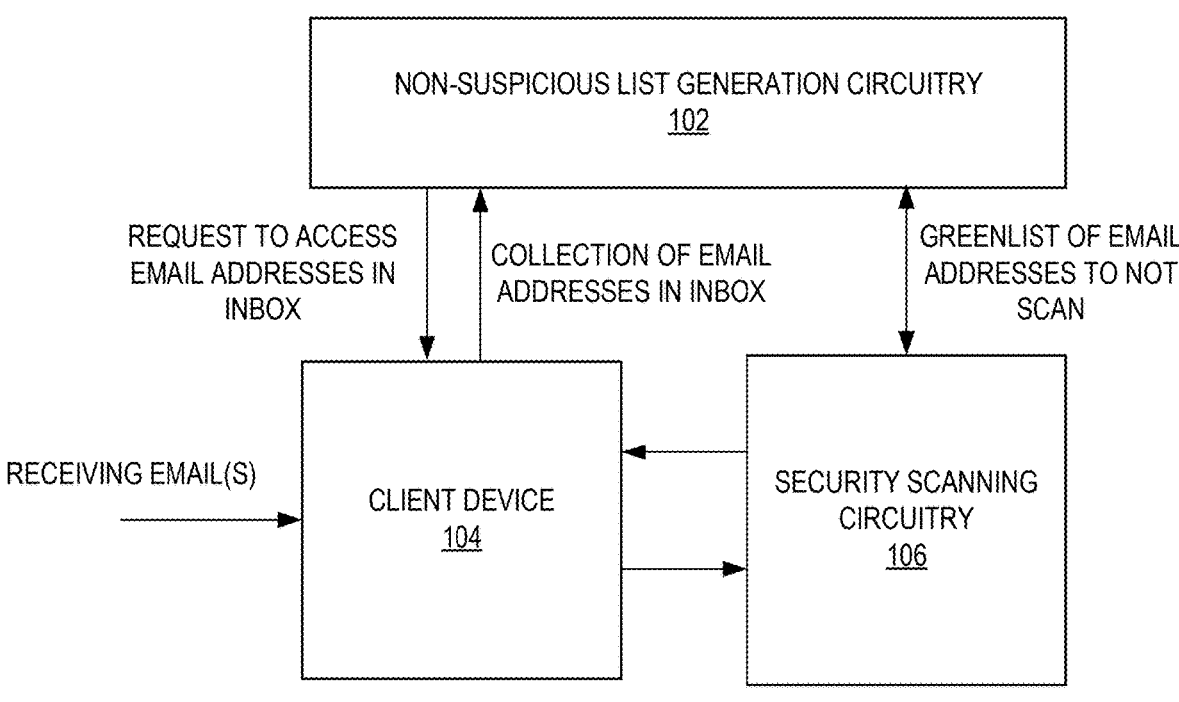

Email-based threats, such as phishing or scams, are a common method of attack that most users suffer daily. Phishing is a fraudulent practice in which an attacker acts as a reputable entity or person in an email. Attackers commonly use phishing emails to distribute malicious links or attachments that can extract login credentials, account numbers and other personal information from victims. One of the problems with email is the open and trusting nature of the protocol. For example, it is simple to create a deceptive email because email protocols are open, making an email protocol available to anyone who wants to use them. Attackers can manipulate the domain address (e.g., the "from" address) to appear as if it is coming from a trusted domain/sender. Additionally, attackers can manipulate the body (e.g., the content) of the email message to appear legitimate. The manipulation of the domain address is referred to as email spoofing. Email spoofing is a type of identity fraud where someone alters an email's metadata to make it appear as if it came from a different sender than it actually did. This can include changing a sender's name, email address, phone number, or website URL. Spoofing is possible because the email protocol, such as Simple Mail Transfer Protocol (SMTP), does not have an authentication mechanism.

To solve the email spoofing problem, the cybersecurity industry created Domain-based Message Authentication, Reporting, and Conformance (DMARC). DMARC is an email security protocol that helps prevent email spoofing and spam. For example, DMARC helps protect against a spoofing situation where an attacker forges the "From" address of an email to make it appear to come from a legitimate organization (domain entity). For example, an attacker might send a fraudulent email that appears to be from PayPal in an attempt to get the receiver's account information. DMARC can block these emails before the intended receiver sees them in his/her inbox.

DMARC is a standard that builds on other email authentication protocols, such as Domain Name System (DNS), DomainKeys Identified Mail (DKIM), and Sender Policy Framework (SPF). SPF allows a domain owner to specify which IP addresses are authorized to send an email on their behalf. DKIM uses an encrypted signature to verify if an email sender is who they say they are and gives a key to the recipient to check back with the sender's DNS record. Both SPF and DKIM produce individual authentication identifiers that help validate email in different ways. When a domain owner implements both SPF and DKIM, the receiving server can identify who an email is from, but does not know if all the domain owner's traffic is properly configured. Therefore, the receiving server cannot act on knowledge about who an email is from. DMARC compiles the results from SPF and DKIM to accurately identify if an email is from an authorized sender or a fraudulent impersonator and can therefore actively block phishing attacks by enforcing a policy. An organization implementing DMARC can instruct receiving servers on how to deal with emails that use the domain owner's domain by configuring the policy. DMARC allows domain owners to create policies such as reject or quarantine outgoing messages that don't pass these protocols.

Some domain owners are implementing DMARC, but not all of them. Therefore, DMARC only partially solves the problem of detecting and eliminating threats. To further detect threats, solutions traditionally focus on the artifacts embedded within the email (e.g., URLs or attachments) to determine if an email is suspicious or not. However, some scams may not include embedded artifacts, such as URLs or attachments, and therefore are undetectable by traditional solutions. Artificial intelligence (AI) models are solutions used for such emails that are undetectable by traditional solutions.

AI models operate as a security system for email accounts by reading emails from an inbox, analyzing/scanning the emails to identify any security threats based on training, and flagging any emails that have or potentially have a security threat. Using AI in this manner to detect threats to individuals is accurate, but not efficient. AI models incur costs and are limited to scalability because analyzing/scanning every email in the inbox is unfeasible given the time it takes to execute an AI model and the number of emails each individual receives per day. For example, a company or organization might deploy one model to operate on all inboxes of its members or employees, resulting in thousands or even millions of email messages needing to be analyzed per day. As a result of the unfeasibility, companies or organizations either select limiting the scans or select using less accurate AI models, which are faster but less effective at detecting threats.

Examples disclosed herein provide a mechanism to skip emails to analyze in a nonlimiting way, due to the knowledge that the emails are trusted and therefore do not contain any threats. Examples disclosed herein provide this mechanism based on compiling a trusted list of entities of parent domains. The trusted list of entities is compiled based on whether or not the entity is an email provider and whether or not the entity has properly configured DMARC. For example, entities that are email providers are not trusted because email providers have an open protocol that enable any individual to create an email account using their domain. Additionally, entities that are not email providers but do not have DMARC properly configured are not trusted because the domain of such an entity can be spoofed using manipulation tactics, without requiring any type of verification. These non-trusted entities are removed from consideration and not added to the trusted list. The entities that are not email providers and have DMARC properly configured are flagged as "trustworthy' and added to the trusted list. The list, once compiled, is provided to a security threat detecting AI model and informs the model of which emails not to analyze based on the entity associated with the email.

FIG. 1 is a block diagram of an example security environment 100 in which an example non-suspicious list generation circuitry 102 operates to identify entities that are trusted. The security environment 100 includes an example client device 104 and example security scanning circuitry 106.

In FIG. 1, the security environment 100 is an environment in which an organization, an individual, or any other type of entity configures to protect itself from cyber security attacks. The security environment 100 may be deployed, configured, constructed, etc., by an administrator.

In FIG. 1, the non-suspicious list generation circuitry 102 operates to make the security environment 100 more efficient in protecting the organization, individual, or other type of entity. The non-suspicious list generation circuitry 102 communicates with the client device 104 and the security scanning circuitry 106 to generate a lookup table of trusted entities. For example, the non-suspicious list generation circuitry 102 requests emails from the client device 104, analyzes domains of the emails, and creates a lookup table for the security scanning circuitry 106 to utilize when analyzing/scanning emails in real-time to determine which emails need and do not need to be analyzed. The non-suspicious list generation circuitry 102 is described in further detail below in connection with FIG. 2.

In FIG. 1, the client device 104 is a computing device that receives and/or sends emails. For example, the client device 104 may be a personal computer, a smart phone, a desktop, a tablet, etc. In some examples, when the security environment 100 is an environment for an organization, the client device 104 represents a plurality of client devices. In some examples, the client device 104 may be a server. The client device 104 includes one or more inboxes corresponding to a collection of sent and received emails. The client device 104 provides a collection of emails in the inbox(es) to the non-suspicious list generation circuitry 102. The client device 104 has properly configured a Domain-based Message Authentication, Reporting, and Conformance (DMARC) protocol. For example, the client device 104 has configured a policy for how the DMARC protocol should handle unauthorized emails.

In FIG. 1, the security scanning circuitry 106 is processing circuitry that processes an artificial intelligence (AI)-based threat detection model. For example, the security scanning circuitry 106 processes a large language model (LLM), a convolutional neural network (CNN), or any other type of AI model that can be trained to detect security threats at the client device 104. An AI model operates by receiving an input such as an email, transforming the input into digestible features (e.g., a vector including numerical representations of the input), and generating a probability that the input is a threatening or a non-threatening email. In this example, the security scanning circuitry 106 processes an AI model that is trained to detect security threats at the client device 104 in substantially real time. For example, the security scanning circuitry 106 intercepts and/or obtains data (e.g., emails, notifications, attachments, etc.) from the client device 104 and analyzes the data to determine whether the data is threatening. In some examples, when the security scanning circuitry 106 detects data as threatening, the security scanning circuitry 106 sends a notification to the client device 104 that instructs the client device 104 to block the data from the client device 104.

In some examples, the security scanning circuitry 106 accesses and/or stores the non-suspicious list lookup table, generated by the non-suspicious list generation circuitry 102. The security scanning circuitry 106 uses the non-suspicious list lookup table to determine which data (e.g., emails) to input or not input to the AI model. For example, the security scanning circuitry 106 obtains an email from the client device 104, determines whether the email has an email address in the non-suspicious list lookup table, and skips analyzing the email for threats if the email address is on the non-suspicious list. Therefore, the non-suspicious list lookup table makes the security scanning circuitry 106 more efficient by reducing redundancy and increasing the speed at which data threatening data is detected.

As used herein, the "non-suspicious list lookup table", a "list of non-suspicious email addresses", "greenlist", and "allowlist" may be used interchangeably.

Figure 2:
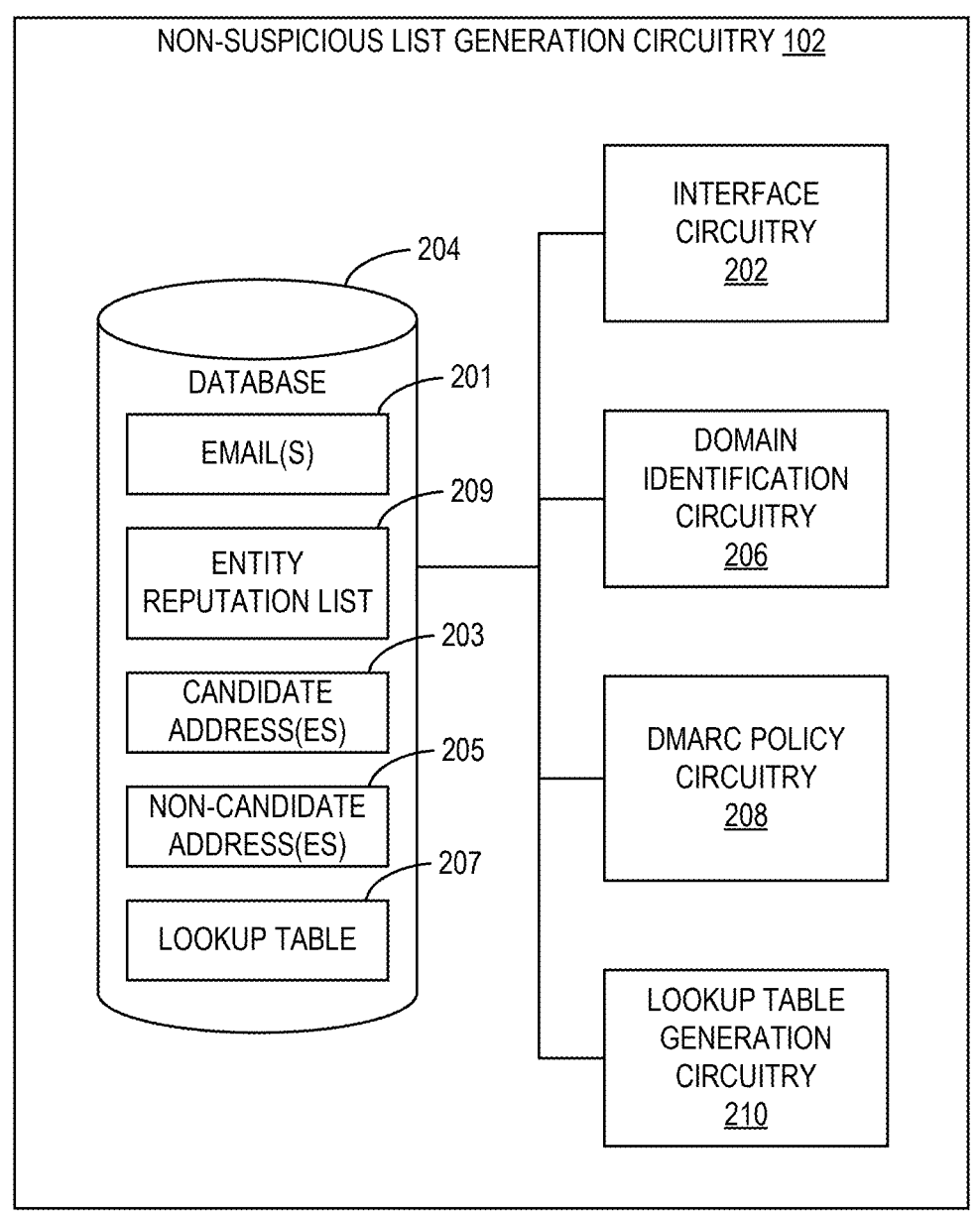
FIG. 2 is a block diagram of an example implementation of the non-suspicious list generation circuitry of FIG. 1.

FIG. 2 is a block diagram of an example implementation of the non-suspicious list generation circuitry 102 of FIG. 1 to do create a lookup table of authorized and/or trusted email entities. The non-suspicious list generation circuitry 102 includes example interface circuitry 202, an example database 204, example domain identification circuitry 206, example Domain-based Message Authentication, Reporting, and Conformance (DMARC) policy circuitry 208, and example lookup table generation circuitry 210.

The non-suspicious list generation circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the non-suspicious list generation circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

Figure 3:
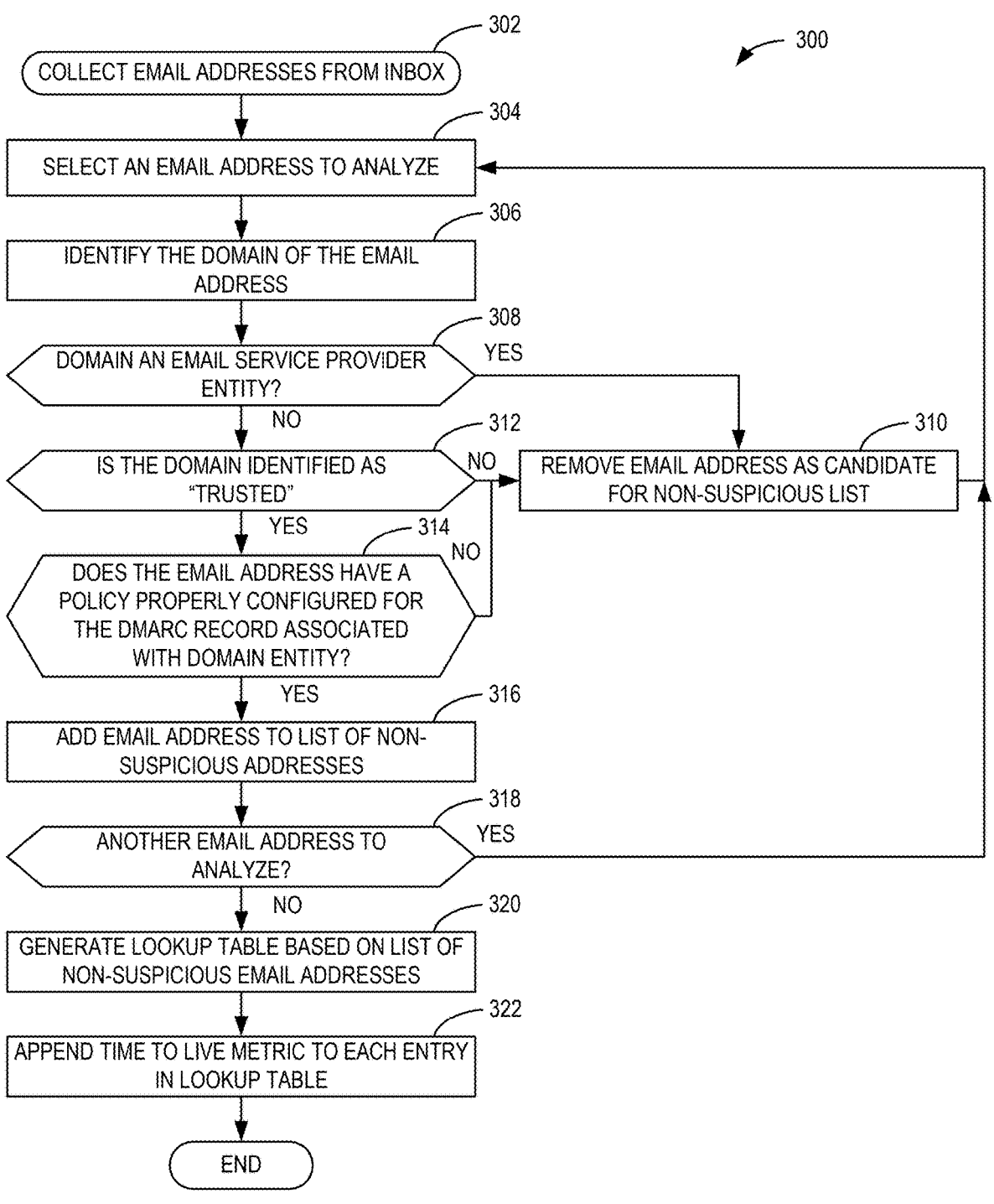
FIGS. 3-4 are flowcharts representative of example machine readable instructions and/or example operations that may be executed, instantiated, and/or performed by example programmable circuitry to implement the non-suspicious list generation circuitry of FIG. 2.
Figure 4:
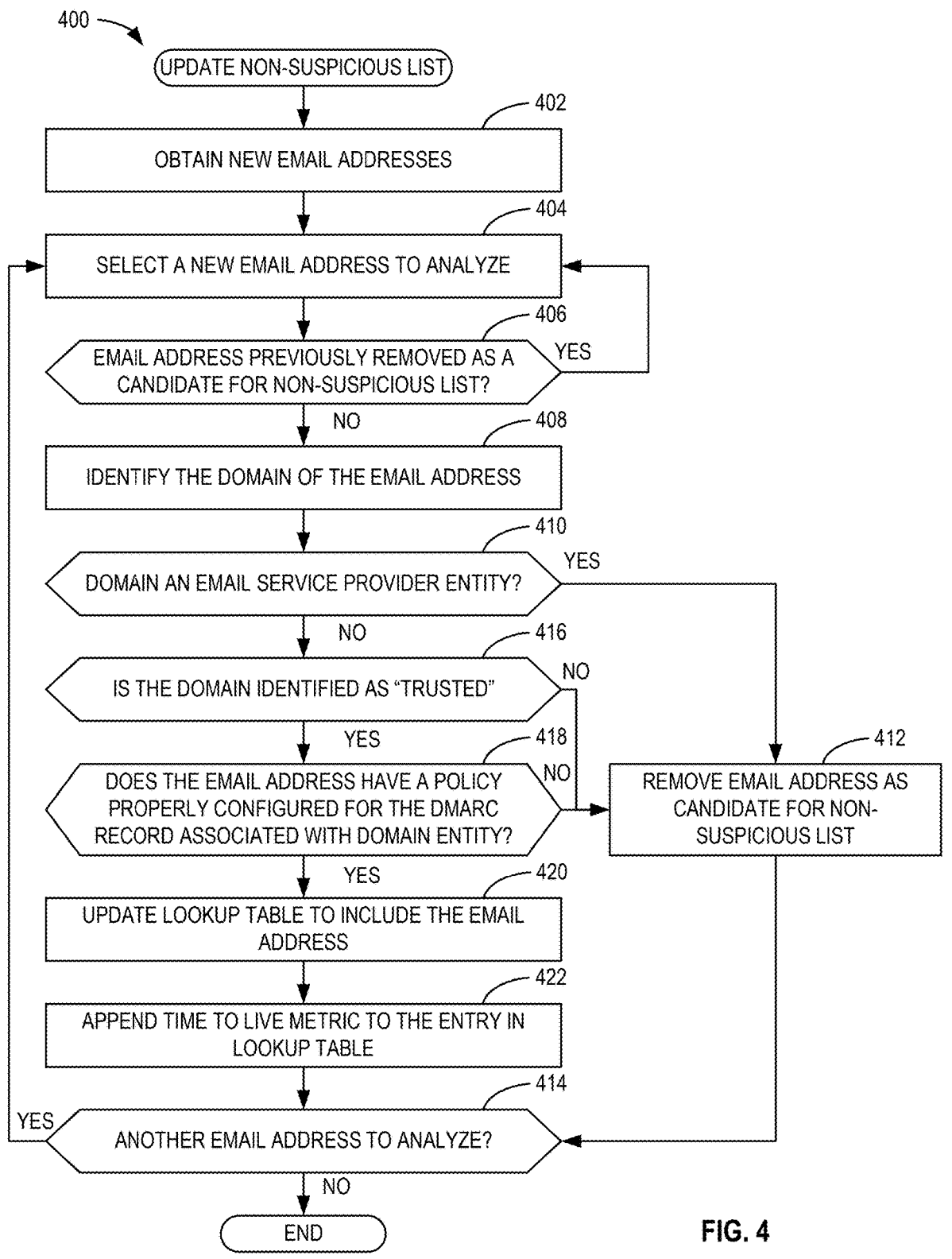

In some examples, the interface circuitry 202 is instantiated by programmable circuitry executing interface instructions and/or configured to perform operations such as those represented by the flowchart(s) of FIGS. 3 and 4. In some examples, the domain identification circuitry 206 is instantiated by programmable circuitry executing domain identification instructions and/or configured to perform operations such as those represented by the flowcharts of FIGS. 3 and 4. In some examples, the DMARC policy circuitry 208 is instantiated by programmable circuitry executing DMARC policy instructions and/or configured to perform operations such as those represented by the flowcharts of FIGS. 3 and 4. In some examples, the lookup table generation circuitry 210 is instantiated by programmable circuitry executing lookup table generation instructions and/or configured to perform operations such as those represented by the flowcharts of FIGS. 3 and 4.

In FIG. 2, the non-suspicious list generation circuitry 102 includes the interface circuitry 202 to communicate data to and from the client device 104 (FIG. 1) and the security scanning circuitry 106 (FIG. 1). For example, the interface circuitry 202 interfaces with the client device 104 to request and obtain email addresses from one or more client device inboxes. The interface circuitry 202 causes the client device 104 to store email(s) 201 in the database 204. In some examples, the interface circuitry 202 interfaces with the security scanning circuitry 106 to provide a lookup table with authorized and/or trusted email addresses.

In some examples, the non-suspicious list generation circuitry 102 includes means for obtaining emails. For example, the means for obtaining emails may be implemented by interface circuitry 202. In some examples, the interface circuitry 202 may be instantiated by programmable circuitry such as the example programmable circuitry 612 of FIG. 6. For instance, the interface circuitry 202 may be instantiated by the example microprocessor 700 of FIG. 7 executing machine executable instructions such as those implemented by at least blocks 302 of FIG. 3 and 402 of FIG. 4. In some examples, the interface circuitry 202 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the interface circuitry 202 may be instantiated by any other combination of hardware, software, and/or firmware. For example, the interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for determining includes means for notifying scanning circuitry that a lookup table is available.

In FIG. 2, the database 204 stores example emails 201, example candidate address(es) 203, example non-candidate address(es) 205, an example lookup table 207, and an example entity reputation list 209. The database 204 of FIG. 2 is implemented by any memory, storage device and/or storage disc for storing data such as, for example, flash memory, magnetic media, optical media, solid state memory, hard drive(s), thumb drive(s), etc. Furthermore, the data stored in the database 204 may be in any data format such as, for example, binary data, comma delimited data, tab delimited data, structured query language (SQL) structures, etc. While, in the illustrated example, the database 204 is illustrated as a single memory, the database 204 and/or any other data storage devices described herein may be implemented by any number and/or type(s) of memories. The database 204 may implement the means for storing email(s) 201, candidate address(es) 203, non-candidate address(es) 205, a lookup table 207, and an example entity reputation list 209.

In FIG. 2, the non-suspicious list generation circuitry 102 includes the domain identification circuitry 206 identifies an entity that is a domain of an email address. The domain identifies an email server handling the email address's incoming and outgoing messages. The domain is the part of email address that appears after the "@" symbol. For example, a user using Gmail® as their email service has the domain name for such an email address of "gmail.com." In some examples, businesses, professionals, and other entities create custom email domains that match their name, brand, or website. For example, the United States Patent and Trademark Office (USPTO) uses a website domain named "uspto.gov", and also has an email domain with the same domain name, such as "billy.bob@uspto.gov".

In some examples, users, businesses, professionals, and other entities use subdomains in email addresses to manage email communications, such categorizing emails and targeting specific groups. A subdomain is a prefix that appears before a parent domain (e.g., root domain), and allows emails to be sent and delivered from the subdomain instead of the parent domain. An example of an email with a subdomain, where the parent domain is the USPTO, is "name@patents.uspto.gov" or "name@trademarks.uspto.gov". In this example, "patents" and "trademarks" are the subdomains and may be used to manage the emails related to patents and the emails related to trademarks.

The domain identification circuitry 206 identifies the entity of the domain or the parent domain. To do this, the domain identification circuitry 206 first parses the email address to determine a name of the domain or parent domain. In some examples, the domain identification circuitry 206 uses any method to determine the name of the domain or parent domain. Second, the domain identification circuitry 206 determines an entity associated with the domain or parent domain. For example, the domain identification circuitry 206 determines that the United States Patent and Trademark Office is the entity associated with "name@patents.uspto.gov", or that Google® is the entity associated with "name@gmail.com". In some examples, when the email address has a subdomain, the domain identification circuitry 206 ignores the subdomain when determining the entity associated with the email address. This is because the subdomain either falls under the entity associated with the parent domain or because the subdomain has an entity that falls under the entity associated with the parent domain.

The domain identification circuitry 206 determines whether the identified entity is an email service provider. Email services providers and/or email service providing entities are technology companies that make it easier for people to build email lists and send emails. An email service provider provides the technical efforts behind the sending and receiving of emails. Generally, email service providers have an open protocol, allowing anyone to make and send emails. Email service providers include Gmail®, Outlook®, Yahoo®, AOL Mail, etc.

If the domain identification circuitry 206 determines that the identified entity is an email service provider, the domain identification circuitry 206 removes the email address as a candidate for the non-suspicious list. For example, the domain identification circuitry 206 flags the email address as a non-candidate address 205. Email addresses with domains associated with email service providers are non-candidate addresses 205 because such emails are easily spoofed and, therefore, not trusted. The purpose of the non-suspicious list is to provide the security scanning circuitry 106 with email addresses that are certain to be trusted, not ones that may or may not be trusted. Therefore, any email address from an email service provider cannot be added to the non-suspicious list.

If the domain identification circuitry 206 determines that the identified entity is not an email service provider, then the domain identification circuitry 206 determines whether the entity has a trusted reputation. For example, the domain identification circuitry 206 uses the entity reputation list 209 to identify whether an entity is trusted, unknown, or not trusted. The entity reputation list 209 is a list of URL-based and domain-based reputations, including URLs previously identified as trustworthy, untrustworthy, and/or unknown and domains previously identified as trustworthy, untrustworthy, and/or unknown. In some examples, the entity reputation list 209 is implemented by McAfee® Threat Intelligence Exchange, where threat intelligence data is shared globally to organizations. Additionally and/or alternatively, the entity reputation list 209 may be implemented by any security solutions system.

If the domain identification circuitry 206 determines that the identified entity is not an email service provider and is identified in the entity reputation list 209 as trustworthy, then the domain identification circuitry 206 flags the email address as a candidate address 203. However, that does not mean that the email address will be added to the non-suspicious list lookup table 207. The email address has to go through a second check before being added to the non-suspicious list lookup table 207.

In some examples, the non-suspicious list generation circuitry 102 includes means for determining a domain of an email address. For example, the means for determining a domain of an email address may be implemented by domain identification circuitry 206. In some examples, the domain identification circuitry 206 may be instantiated by programmable circuitry such as the example programmable circuitry 612 of FIG. 6. For instance, the domain identification circuitry 206 may be instantiated by the example microprocessor 700 of FIG. 7 executing machine executable instructions such as those implemented by at least blocks 306, 308, 310, and 312 of FIG. 3 and at least blocks 406, 408, 410, 412, and 416 of FIG. 4. In some examples, the domain identification circuitry 206 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the domain identification circuitry 206 may be instantiated by any other combination of hardware, software, and/or firmware. For example, the domain identification circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for determining a domain of an email address includes means for determining a reputation of the domain. In some examples, the means for determining a domain of an email address includes means for identifying whether the domain is associated with an entity that is an email service provider.

In FIG. 2, the non-suspicious list generation circuitry 102 includes the DMARC policy circuitry 208 to determine whether the entity has a DMARC policy properly configured. The DMARC policy circuitry 208 checks the email address DMARC policy by analyzing an email header. The emails 201 have email headers. An email header is a hidden snippet of code (e.g., metadata) in an email 201 that contains detailed information about the sender, the recipient, and how the message was routed and authenticated. For example, the email header includes results for SPF, DKIM, and possibly DMARC authentication checks. In some examples, the email header includes a DMARC policy, such as "p=reject", "p=quarantine", or "p=none", where "p" refers to policy and "reject," "quarantine," and "none" refer to actions the email server is to take when an incoming email does not pass an authentication check.

The DMARC policy circuitry 208 determines that a DMARC policy is properly configured when the email 201 has policy set to reject or quarantine (e.g., p=reject, p=quarantine). The DMARC policy circuitry 208 confirms the email address is a candidate address 203 for the non-suspicious list lookup table 207 when the email 201 has a DMARC policy properly configured.

The DMARC policy circuitry 208 determines that a DMARC policy is not properly configured when the email 201 has a policy set to do nothing (e.g., p=none). This is not a proper configuration because when the policy is set to do nothing, no steps are taken when an email does not pass an authentication check and the email is sent to the receiver's inbox. Therefore, the DMARC policy circuitry 208 rejects the email address as a candidate address 203 and flags the email address as a non-candidate address 205 that cannot be added to the non-suspicious list lookup table 207. The DMARC policy circuitry 208 therefore avoids situations where a sender creates an email with an entity that has a valid DMARC record (e.g., the entity has set up DMARC for sending and receiving emails), but the sender of that entity does not take further steps to configure the policy, making that particular sender uncertain as to their trustworthiness.

In some examples, the non-suspicious list generation circuitry 102 includes means for determining an email address has a policy configured for a domain-based message authentication, reporting, and conformance (DMARC) record. For example, the means for determining an email address has a policy configured for a (DMARC) record may be implemented by DMARC policy circuitry 208. In some examples, the DMARC policy circuitry 208 may be instantiated by programmable circuitry such as the example programmable circuitry 612 of FIG. 6. For instance, the DMARC policy circuitry 208 may be instantiated by the example microprocessor 700 of FIG. 7 executing machine executable instructions such as those implemented by at least blocks 310, 314, and 316 of FIG. 3 and at least blocks 412 and 418 of FIG. 4. In some examples, the DMARC policy circuitry 208 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the DMARC policy circuitry 208 may be instantiated by any other combination of hardware, software, and/or firmware. For example, the DMARC policy circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for determining an email address has a policy configured for a (DMARC) record includes means for determining an email address does not have a policy configured for a DMARC record.

In FIG. 2, the lookup table generation circuitry 210 generates a list of non-suspicious email addresses, using the candidate addresses 203, for the security scanning circuitry 106 to use. In some examples, the list of non-suspicious email addresses is a lookup table 207. As used herein, a lookup table is a data structure that maps input values to output values. Here, the input value is an email address and the output value is "skip" or "ignore" or "trusted". The lookup table generation circuitry 210 therefore populates the input section of the lookup table 207 with the candidate address(es) 203, which are non-suspicious email addresses, and populates the output section of the lookup table 207 with a value that informs the security scanning circuitry 106 to skip a analyzing of an email associated with the candidate address 203. For example, the lookup table generation circuitry 210 populates the output section of the lookup table 207 with a "trusted" flag, a "skip" flag, an "ignore email" flag, or any other type of value/flag that would cause the security scanning circuitry 106 to not analyze the email associated with the candidate address 203. The lookup table generation circuitry 210 may implement any program and/or algorithm to generate the lookup table 207.

In some examples, the lookup table generation circuitry 210 periodically updates the lookup table 207. For example, after a generation of the lookup table 207, the client device 104 receives new emails from different email addresses. The lookup table generation circuitry 210 then adds any newly identified candidate address(es) 203 to the lookup table 207.

The lookup table generation circuitry 210 appends a time to live (TTL) to each lookup table entry. Time to Live (TTL) term refers to a method of limiting the amount of time data can exist in a network or computer. TTL is implemented as a timestamp or counter that's either embedded in or attached to the data. When the specified time or event count has passed, the data is either revalidated or discarded. In this example, the data is the email addresses in the input section of the lookup table. In this example, when the specified time or event count has occurred, the domain identification circuitry 206 and the DMARC policy circuitry 208 reevaluate and revalidate the email address associated with the passing of the specified time or event. The lookup table generation circuitry 210 appends an event count or specified time clock to each non-suspicious email address (e.g., lookup table entry) to adapt to changes in the configuration of DMARC records (e.g., policy changes) or to an event of a trusted entity become untrusted.

In some examples, the non-suspicious list generation circuitry 102 includes means for generating a lookup table based on a list of non-suspicious email addresses. For example, the means for generating a lookup table based on a list of non-suspicious email addresses may be implemented by lookup table generation circuitry 210. In some examples, the lookup table generation circuitry 210 may be instantiated by programmable circuitry such as the example programmable circuitry 612 of FIG. 6. For instance, the lookup table generation circuitry 210 may be instantiated by the example microprocessor 700 of FIG. 7 executing machine executable instructions such as those implemented by at least blocks 320 and 322 of FIG. 3 and at least blocks 420 and 422 of FIG. 4. In some examples, lookup table generation circuitry 210 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the lookup table generation circuitry 210 may be instantiated by any other combination of hardware, software, and/or firmware. For example, the lookup table generation circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the means for generating a lookup table based on a list of non-suspicious email addresses includes generating a lookup table based on the list of non-suspicious email addresses.

In an example operation of the non-suspicious list generation circuitry 102, the interface circuitry 202 obtains three email addresses: do-not-reply@support.mcafee.com, orders@toystore.com, and newsletter@sports.com. The three email addresses are stored in the database 204. The domain identification circuitry 206 analyzes the first email address, do-not-reply@support.mcafee.com, to identify the parent domain. The domain identification circuitry 206 determines that the parent domain is "mcafee.com", while the subdomain is "support". The domain identification circuitry 206 determines that the entity for "mcafee.com" is McAfee® and is not an email service provider. The domain identification circuitry 206 further checks the entity reputation list 209 and determines that "mcafee.com" has a reputation equal to "trusted". The domain identification circuitry 206 marks the do-not-reply@support.mcafee.com email as a candidate address 203. Then, the DMARC policy circuitry 208 checks the email header of the do-not-reply@support.mcafee.com email to determine whether the policy is properly configured. In this example, the DMARC policy circuitry 208 determines that the policy is properly configured to "reject" and keeps the email address do-not-reply@support.mcafee.com as a candidate address 203.

The domain identification circuitry 206 then analyzes the second email address, orders@toystore.com, to identify the domain. The domain identification circuitry 206 determines that the domain is "toystore.com". The domain identification circuitry 206 determines that the entity for "toystore.com" is not an email service provider, but that the entity reputation list 209 has a reputation for "toystore.com" equal to "unknown". The domain identification circuitry 206 marks the orders@toystore.com email as a non-candidate address 205.

The domain identification circuitry 206 finally analyzes the third email address, newsletter@sports.com, to identify the domain. The domain identification circuitry 206 determines that the domain is "sports.com". The domain identification circuitry 206 determines that the entity for "sports-.com" is not an email service provider. The domain identification circuitry 206 further checks the entity reputation list 209 and determines that "sports.com" has a reputation equal to "trusted". The domain identification circuitry 206 marks the newsletter@sports.com email as a candidate address 203. Then, the DMARC policy circuitry 208 checks the email header of the newsletter@sports.com email to determine whether the policy is properly configured. In this example, the DMARC policy circuitry 208 determines that the policy is not properly configured to "reject" or "quarantine", and removes the email address newsletter@sports.com from the candidate address(es) 203 and marks newsletter@sports.com as a non-candidate address 205.

Finally, the lookup table generation circuitry 210 generates and populates a lookup table with the candidate address 203: do-not-reply@support.mcafee.com. The lookup table generation circuitry 210 appends a TTL to the do-not-reply@support.mcafee.com entry, and notifies the security scanning circuitry 106 that a lookup table of non-suspicious emails is available.

While an example manner of implementing the non-suspicious list generation circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface circuitry 202, the example database 204, the example domain identification circuitry 206, the example DMARC policy circuitry 208, the example lookup table generation circuitry 210, and/or, more generally, the example non-suspicious list generation circuitry 102 of FIG. 2, may be implemented by hardware alone or by hardware in combination with software and/or firmware. Thus, for example, any of the example interface circuitry 202, the example database 204, the example domain identification circuitry 206, the example DMARC policy circuitry 208, the example lookup table generation circuitry 210, and/or, more generally, the example non-suspicious list generation circuitry 102, could be implemented by programmable circuitry in combination with machine readable instructions (e.g., firmware or software), processor circuitry, analog circuit(s), digital circuit(s), logic circuit(s), programmable processor (s), programmable microcontroller(s), graphics processing unit(s) (GPU(s)), digital signal processor(s) (DSP(s)), ASIC (s), programmable logic device(s) (PLD(s)), and/or field programmable logic device(s) (FPLD(s)) such as FPGAs. Further still, the example non-suspicious list generation circuitry 102 of FIG. 2 may include one or more elements, processes, and/or devices in addition to, or instead of, those illustrated in FIG. 2, and/or may include more than one of any or all of the illustrated elements, processes and devices.

Flowcharts representative of example machine readable instructions, which may be executed by programmable circuitry to implement and/or instantiate the non-suspicious list generation circuitry 102 of FIG. 2 and/or representative of example operations which may be performed by programmable circuitry to implement and/or instantiate the non-suspicious list generation circuitry 102 of FIG. 2, are shown in FIGS. 3 and 4. The machine readable instructions may be one or more executable programs or portion(s) of one or more executable programs for execution by programmable circuitry such as the programmable circuitry 612 shown in the example programmable circuitry platform 600 discussed below in connection with FIG. 6 and/or may be one or more function(s) or portion(s) of functions to be performed by the example programmable circuitry (e.g., an FPGA) discussed below in connection with FIGS. 7 and/or 8. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 3 and 4, many other methods of implementing the example non-suspicious list generation circuitry 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3 and 4 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 3 is a flowchart representative of example machine readable instructions and/or example operations 300 that may be executed, instantiated, and/or performed by programmable circuitry to create a non-suspicious list of non-suspicious email addresses for the security scanning circuitry 106 (FIG. 1) to reference. The example machine-readable instructions and/or the example operations 300 of FIG. 3 begin at block 302, at which the non-suspicious list generation circuitry 102 (FIG. 1) collects email addresses from an inbox. For example, the interface circuitry 202 (FIG. 2) requests emails from one or more inboxes of one of more client devices 104 (FIG. 1) and stores emails 201 in the database 204 (FIG. 2).

At block 304, the non-suspicious list generation circuitry 102 selects an email address to analyze. For example, the domain identification circuitry 206 (FIG. 2) extracts the first email address from the list of emails 201 in the database 204 to analyze as a potential candidate for adding to non-suspicious list of non-suspicious email addresses.

At block 306, the non-suspicious list generation circuitry 102 identifies the domain of the email address. For example, the domain identification circuitry 206 extracts the domain name or parent domain name from the email address, such as "gmail.com", "mcafee.com", "sports.com", etc.

At block 308, the non-suspicious list generation circuitry 102 determines whether the domain is an email service provider entity. For example, the domain identification circuitry 206 determines whether the domain name is associated with an entity that is an email service provider, such as Gmail®, Outlook®, Yahoo!®, etc.

At block 308, if the non-suspicious list generation circuitry 102 determines that the domain is an email service provider entity (e.g., block 308 returns a value YES), the non-suspicious list generation circuitry 102 removes the email address as a candidate for the non-suspicious list (block 310). For example, the domain identification circuitry 206 marks the email address as a non-candidate address 205 and stores the email address in the database 204.

At block 310, when the non-suspicious list generation circuitry 102 removes the email address as a candidate for the non-suspicious list, control returns to block 304 where the non-suspicious list generation circuitry 102 selects an email address to analyze. For example, the domain identification circuitry 206 selects the second email address from the list of emails 201 in the database 204 to analyze as a potential candidate for adding to non-suspicious list of non-suspicious email addresses.

At block 308, if the non-suspicious list generation circuitry 102 determines that the domain is not an email service provider entity (e.g., block 308 returns a value NO), the non-suspicious list generation circuitry 102 determines whether the domain is identified as "trusted" (block 312). For example, the domain identification circuitry 206 uses the entity reputation list 209 (FIG. 2) to determine whether the domain has a status/reputation. In some examples, the domain identification circuitry 206 scans the entity reputation list 209 to look for any domains or URLs having the same name as the domain of the email address. Once the domain identification circuitry 206 finds a match, the domain identification circuitry 206 looks at the reputation the email address is flagged with. Any type of reputation equivalent to "trusted" informs the domain identification circuitry 206 that the domain could be a candidate address 203. Any type of reputation equivalent to "unknown" or "untrusted" informs the domain identification circuitry 206 that the domain is not to be a candidate address 203.

At block 312, if the non-suspicious list generation circuitry 102 determines that the domain is not identified as "trusted" (e.g., block 312 returns a value NO), control returns to block 310 where the non-suspicious list generation circuitry 102 removes the email address as a candidate for the non-suspicious list. For example, the domain identification circuitry 206 marks the email address as a non-candidate address 205 and stores the email address in the database 204.

At block 312, if the non-suspicious list generation circuitry 102 determines that the domain is identified as "trusted" (e.g., block 312 returns a value YES), then the non-suspicious list generation circuitry 102 determines whether the email address has a policy properly configured for the DMARC record associated with the domain entity (block 314). For example, the DMARC policy circuitry 208 (FIG. 2) analyzes the email header to see what "p" is set to. When "p" is set to reject or quarantine, the policy is properly configured. When "p" is set to do nothing, the policy is not properly configured and/or not configured at all. It is assumed that the entity of the domain has a valid DMARC record because the domain was identified as trusted in the entity reputation list 209. However, just because there is a valid DMARC record does not mean that the DMARC record is configured to operate as intended (e.g., to reject or quarantine an email that does not pass authentication checks).

At block 314, if the non-suspicious list generation circuitry 102 determines that the email address does not have a policy properly configured for the DMARC record associated with the domain entity (e.g., block 314 returns a value NO), then control returns to block 310 where the non-suspicious list generation circuitry 102 removes the email address as a candidate for the non-suspicious list.

At block 314, if the non-suspicious list generation circuitry 102 determines that the email address does have a policy properly configured for the DMARC record associated with the domain entity (e.g., block 314 returns a value YES), then the non-suspicious list generation circuitry 102 adds the email address to the non-suspicious list of non-suspicious addresses (block 316). For example, the DMARC policy circuitry 208 marks the email address as a candidate address 203 and stores the email address in the database 204.

At block 318, the non-suspicious list generation circuitry 102 determines whether there is another email address to analyze. For example, the interface circuitry 202 and/or the domain identification circuitry 206 determines whether more emails are left in the emails 201 to review.

At block 318, if the non-suspicious list generation circuitry 102 determines there is another email address to analyze (e.g., block 318 returns a value YES), control returns to block 304 where the non-suspicious list generation circuitry 102 extracts the next email address from the list of emails 201 in the database 204 to analyze as a potential candidate for adding to non-suspicious list of non-suspicious email addresses.

At block 318, if the non-suspicious list generation circuitry 102 determines there is not another email address to analyze (e.g., block 318 returns a value NO), the non-suspicious list generation circuitry 102 generates a lookup table based on the non-suspicious list of non-suspicious email addresses (block 320). For example, the lookup table generation circuitry 210 (FIG. 2) populates an input section of the lookup table 207 (FIG. 2) with the candidate address(es) 203, which are non-suspicious email addresses, and populates the output section of the lookup table 207 with a value that informs the security scanning circuitry 106 to skip an analysis of an email associated with one of the candidate addresses 203.

At block 322, the non-suspicious list generation circuitry 102 appends time to live metrics to each entry in the lookup table 207. For example, the lookup table generation circuitry 210 appends an event count or specified time clock to each non-suspicious email address (e.g., lookup table entry) to adapt to changes in the configuration of DMARC records (e.g., policy changes) or to an event of a trusted entity become untrusted.

The operations 300 end when the time to live metrics have been added to the entries in the lookup table 207. In some examples, the operations 300 may be repeated for new client devices 104 and/or different inboxes in the same client device 104.

FIG. 4 is a flowchart representative of example machine readable instructions and/or example operations 400 that may be executed, instantiated, and/or performed by programmable circuitry to update the non-suspicious list of non-suspicious email addresses. The example machine-readable instructions and/or the example operations 400 of FIG. 4 begin at block 402, at which the non-suspicious list generation circuitry 102 (FIG. 1) obtains new email addresses. For example, the interface circuitry 202 (FIG. 2) periodically requests emails from one or more inboxes of one of more client devices 104 (FIG. 1) after generation of the lookup table 207.

At block 404, the non-suspicious list generation circuitry 102 selects a new email address to analyze. For example, the domain identification circuitry 206 (FIG. 2) extracts the email addresses from the list of emails 201 in the database 204 having the most recent time stamp.

At block 406, the non-suspicious list generation circuitry 102 determines whether the email address was previously removed as a candidate for the non-suspicious list. For example, the domain identification circuitry 206 checks the list of non-candidate addresses 205 to determine if any match the selected email address. The domain identification circuitry 206 checks for non-candidate addresses because the domain identification circuitry 206 does not waste processing resources by repeating a process.

At block 406, if the non-suspicious list generation circuitry 102 determines that the email address was previously removed as a candidate for the non-suspicious list (e.g., block 406 returns a value YES), then control returns to block 404. For example, the domain identification circuitry 206 selects a different new email address to analyze to avoid redundant computation.

At block 406, if the non-suspicious list generation circuitry 102 determines that the email address was not previously removed as a candidate for the non-suspicious list (e.g., block 406 returns a value NO), then the non-suspicious list generation circuitry 102 identifies the domain of the email address (block 408). For example, the domain identification circuitry 206 extracts the domain name or parent domain name from the email address, such as "gmail.com", "mcafee.com", "sports.com", etc.

At block 410, the non-suspicious list generation circuitry 102 determines whether the domain is an email service provider entity. For example, the domain identification circuitry 206 determines whether the domain name is associated with an entity that is an email service provider, such as Gmail®, Outlook®, Yahoo!®, etc.

At block 410, if the non-suspicious list generation circuitry 102 determines that the domain is an email service provider entity (e.g., block 410 returns a value YES), the non-suspicious list generation circuitry 102 removes the email address as a candidate for the non-suspicious list (block 412). For example, the domain identification circuitry 206 marks the email address as a non-candidate address 205 and stores the email address in the database 204.

At block 412, when the non-suspicious list generation circuitry 102 removes the email address as a candidate for the non-suspicious list, control turns to block 414 where the non-suspicious list generation circuitry 102 determines whether there is another email address to analyze. For example, the interface circuitry 202 and/or the domain identification circuitry 206 determines whether more emails are left in the emails 201 to review.

At block 414, if the non-suspicious list generation circuitry 102 determines there is another email address to analyze (e.g., block 414 returns a value YES), control returns to block 404 where the non-suspicious list generation circuitry 102 extracts the next new email address from the list of emails 201 in the database 204 to analyze as a potential candidate for adding to non-suspicious list of non-suspicious email addresses.

At block 414, if the non-suspicious list generation circuitry 102 determines there is not another email address to analyze (e.g., block 414 returns a value NO), the operations 400 end.

At block 410, if the non-suspicious list generation circuitry 102 determines that the domain is not an email service provider entity (e.g., block 410 returns a value NO), the non-suspicious list generation circuitry 102 determines whether the domain is identified as "trusted" (block 416). For example, the domain identification circuitry 206 uses the entity reputation list 209 (FIG. 2) to determine whether the domain has a status/reputation. In some examples, the domain identification circuitry 206 scans the entity reputation list 209 to look for any domains or URLs having the same name as the domain of the email address. Once the domain identification circuitry 206 finds a match, the domain identification circuitry 206 looks at the reputation the email address is flagged with. Any type of reputation equivalent to "trusted" informs the domain identification circuitry 206 that the domain could be a candidate address 203. Any type of reputation equivalent to "unknown" or "untrusted" informs the domain identification circuitry 206 that the domain is not to be a candidate address 203.

At block 416, if the non-suspicious list generation circuitry 102 determines that the domain is not identified as "trusted" (e.g., block 416 returns a value NO), control returns to block 412 where the non-suspicious list generation circuitry 102 removes the email address as a candidate for the non-suspicious list. For example, the domain identification circuitry 206 marks the email address as a non-candidate address 205 and stores the email address in the database 204.

At block 416, if the non-suspicious list generation circuitry 102 determines that the domain is identified as "trusted" (e.g., block 416 returns a value YES), then the non-suspicious list generation circuitry 102 determines whether the email address has a policy properly configured for the DMARC record associated with the domain entity (block 418). For example, the DMARC policy circuitry 208 (FIG. 2) analyzes the email header to see what "p" is set to. When "p" is set to reject or quarantine, the policy is properly configured. When "p" is set to do nothing, the policy is not properly configured and/or not configured at all.

At block 418, if the non-suspicious list generation circuitry 102 determines that the email address does not have a policy properly configured for the DMARC record associated with the domain entity (e.g., block 418 returns a value NO), then control returns to block 412 where the non-suspicious list generation circuitry 102 removes the email address as a candidate for the non-suspicious list.

At block 418, if the non-suspicious list generation circuitry 102 determines that the email address does have a policy properly configured for the DMARC record associated with the domain entity (e.g., block 418 returns a value YES), then the non-suspicious list generation circuitry 102 updates the lookup table 207 (FIG. 2) to include the email address (block 420). For example, the lookup table generation circuitry 210 inserts, adds, stores, etc., the email address in the lookup table 207.

At block 422, the non-suspicious list generation circuitry 102 appends time to live metrics to the entry in the lookup table 207. For example, the lookup table generation circuitry 210 appends an event count or specified time clock to the email address (e.g., lookup table entry) to adapt to changes in the configuration of DMARC records (e.g., policy changes) or to an event of a trusted entity become untrusted.

At block 414, the non-suspicious list generation circuitry 102 determines whether there is another email address to analyze. When the non-suspicious list generation circuitry 102 determines that there is another email address (e.g., block 414 returns a value YES), control returns to block 404 where the non-suspicious list generation circuitry 102 selects a new email address to analyze.

When the non-suspicious list generation circuitry 102 determines that there is not another email address (e.g., block 414 returns a value NO), the operations 400 end. In some examples, the operations 400 are repeated when the interface circuitry 202 obtains new email addresses from the client device 104.

Figure 5:
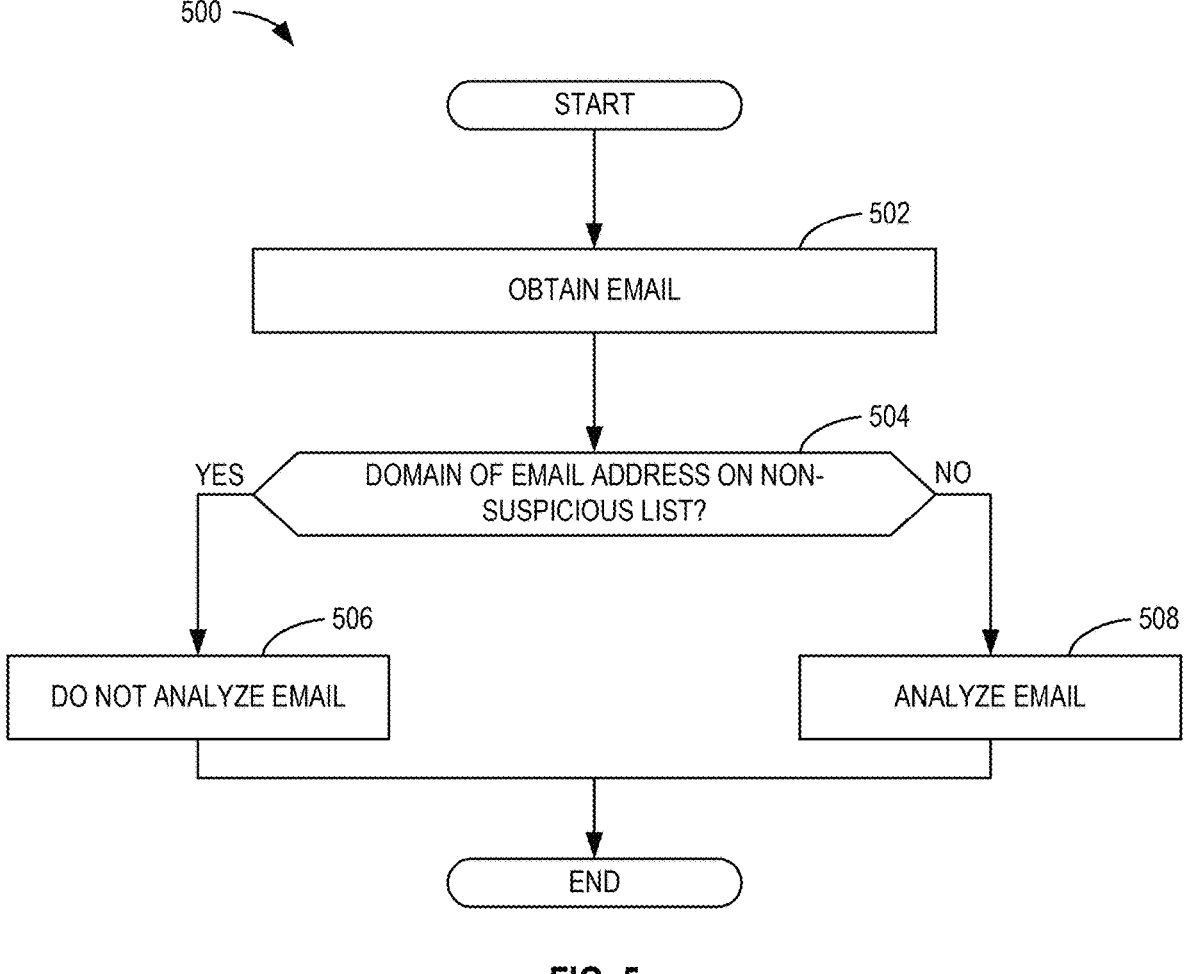
FIG. 5 is a flowchart representative of example machine readable instructions and/or example operations that may be executed, instantiated, and/or performed by example programmable circuitry to implement the security scanning circuitry of FIG. 1.

FIG. 5 is a flowchart representative of example machine readable instructions and/or example operations 500 that may be executed, instantiated, and/or performed by programmable circuitry to select emails to analyze based on the non-suspicious list. The example machine-readable instructions and/or the example operations 500 of FIG. 5 begin at block 502, at which the security scanning circuitry 106 (FIG. 1) obtains an email. For example, the security scanning circuitry 106 obtains an email in real time from one of the one or more inboxes of a client device 104 (FIG. 1) to determine whether the email is safe for a user of the client device 104 to access.

At block 504, the security scanning circuitry 106 whether a domain of the email address is on the non-suspicious list. For example, before analyzing the email for threats, the security scanning circuitry 106 accesses the non-suspicious list lookup table 207 (FIG. 2) and looks for a match between the domain of the email obtained and any email domain on in the lookup table 207.

At block 504, when the security scanning circuitry 106 determines the domain of the email address is on the non-suspicious list (e.g., block 504 returns a value YES), the security scanning circuitry 106 does not analyze the email (block 506). For example, when a match has been found, the security scanning circuitry 506 skips an analysis of the email associated with the email address domain and moves on to the next one (if there is a next email to be analyzed). Skipping an analysis of the email means ignoring the email or not inputting the email into the AI model for threat detection, because no threats come from that domain. The user of the client device is safe to access the email, and it would be a waste of processing resources to scan and analyze.

At block 504, when the security scanning circuitry 106 determines the domain of the email address is not on the non-suspicious list (e.g., block 504 returns a value NO), the security scanning circuitry 106 analyzes the email (block 508). For example, when no match is found, the security scanning circuitry 106 needs to determine whether the email is suspicious, malicious, and/or a threat to the user of the client device 104. Therefore, the security scanning circuitry 106 inputs the email into the AI model to find or detect any threats before allowing the user to access the email.

The operations 500 end when the security scanning circuitry 106 either analyzes the email or ignores the email. In some examples, the operations 500 are repeated when the client device 104 and, therefore, the security scanning circuitry 106 obtain an incoming email.

Figure 6:
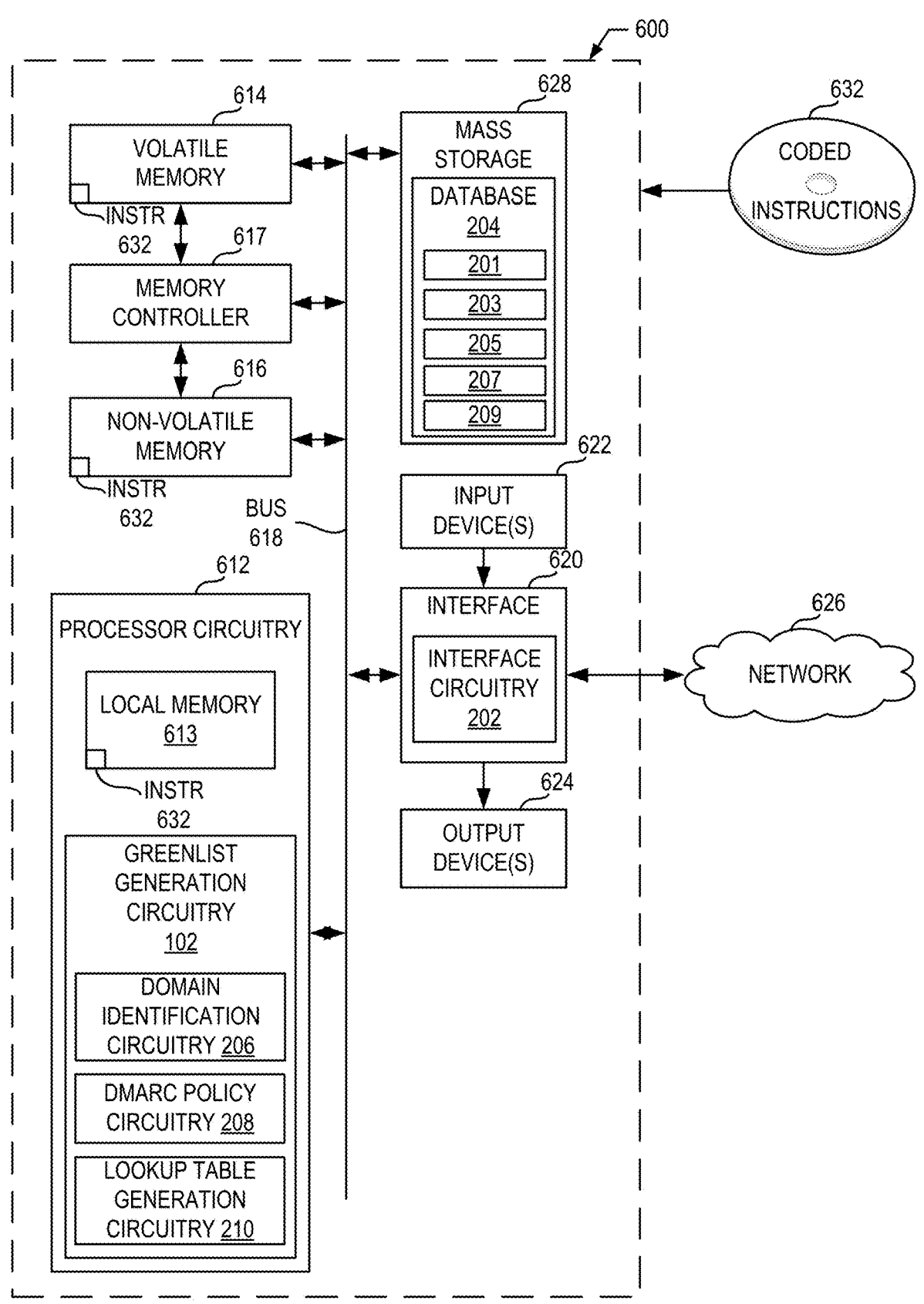
FIG. 6 is a block diagram of an example processing platform including programmable circuitry structured to execute, instantiate, and/or perform the example machine readable instructions and/or perform the example operations of FIGS. 3 and 4 to implement the non-suspicious list generation circuitry of FIG. 2.

FIG. 6 is a block diagram of an example programmable circuitry platform 600 structured to execute and/or instantiate the example machine-readable instructions and/or the example operations of FIGS. 3 and 4 to implement the non-suspicious list generation circuitry 102 of FIG. 2. The programmable circuitry platform 600 can be, for example, or any other type of computing and/or electronic device. a server, a personal computer, a workstation, a self-learning machine (e.g., a neural network), a mobile device (e.g., a cell phone, a smart phone, a tablet such as an iPad™), The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example non-suspicious list generation circuitry 102, the example domain identification circuitry 206, the example DMARC policy circuitry 208, and the example lookup table generation circuitry 210.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 620 implements the example interface circuitry 202.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, and/or a printer. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs. In this example, the mass storage discs or devices 628 implements the example database 204 to store example email(s) 201, example candidate address(es) 203, example non-candidate address(es) 205, an example entity reputation list 209, and an example lookup table 207.

The machine readable instructions 632, which may be implemented by the machine readable instructions of FIGS. 3 and 4, may be stored in the mass storage device 628, in the volatile memory 614, in the non-volatile memory 616, and/or on at least one non-transitory computer readable storage medium such as a CD or DVD which may be removable.

Figure 7:
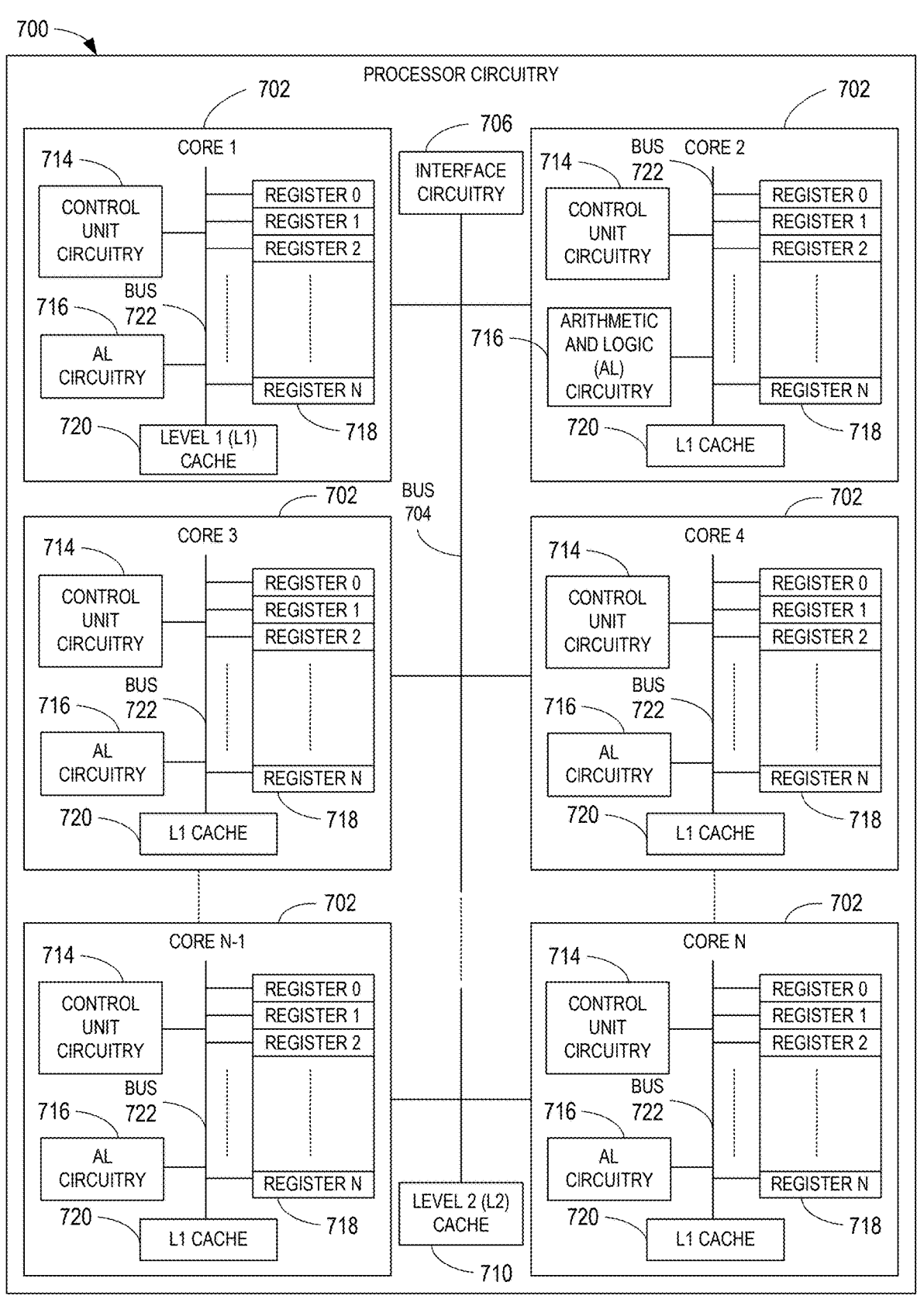
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowcharts of FIGS. 3 and 4 to effectively instantiate the circuitry of FIG. 2 as logic circuits to perform operations corresponding to those machine readable instructions. In some such examples, the circuitry of FIG. 2 is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 3 and 4.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

Figure 8:
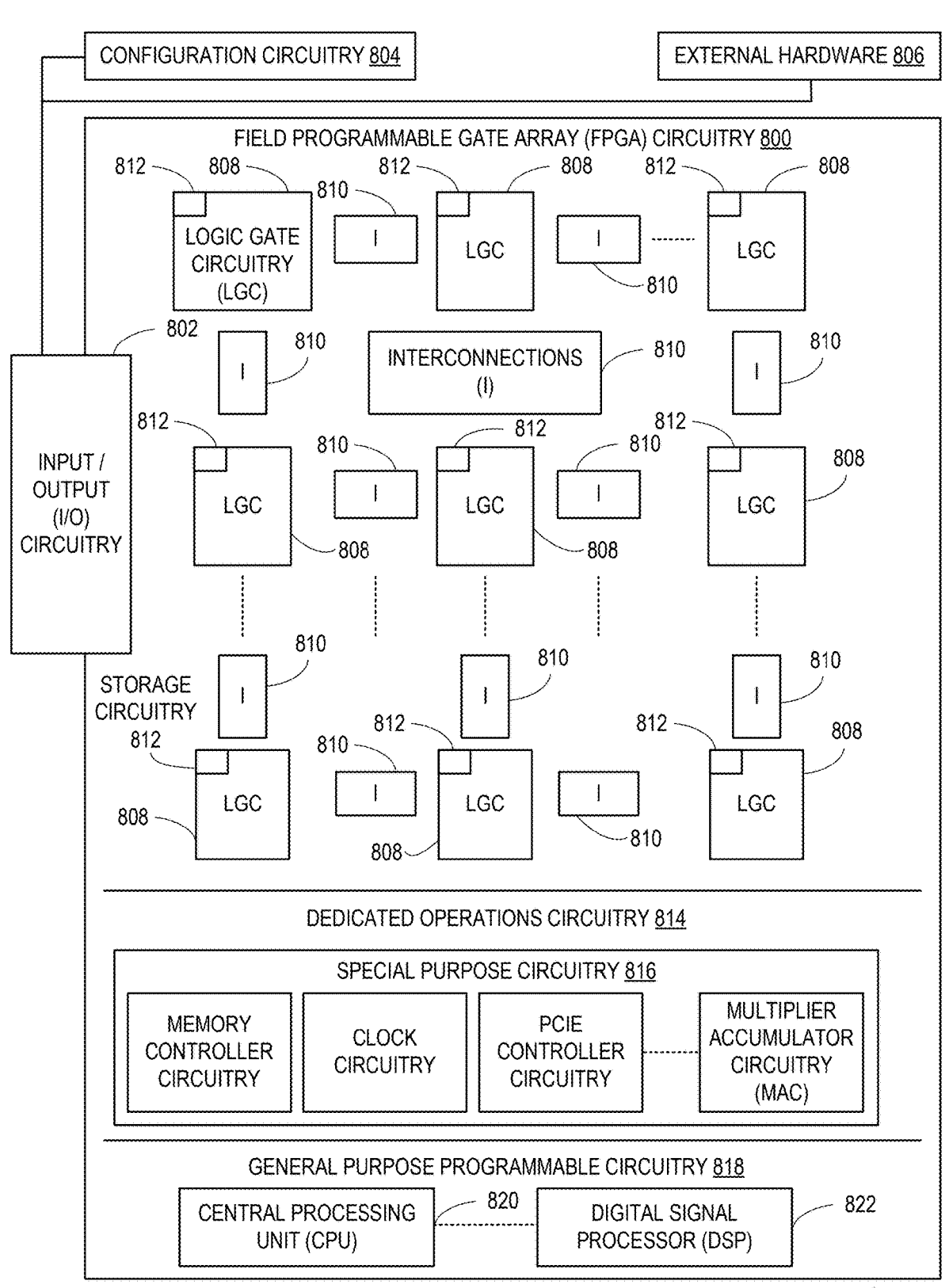
FIG. 8 is a block diagram of another example implementation of the programmable circuitry of FIG. 6.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine readable instructions represented by the flowchart(s) of FIGS. 3 and 4 but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 3 and 4. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 3 and 4. As such, the FPGA circuitry 800 may be configured and/or structured to effectively instantiate some or all of the operations/functions corresponding to the machine readable instructions of the flowchart(s) of FIGS. 3 and 4 as dedicated logic circuits to perform the operations/functions corresponding to those software instructions in a dedicated manner analogous to an ASIC. Therefore, the FPGA circuitry 800 may perform the operations/functions corresponding to the some or all of the machine readable instructions of FIGS. 3 and 4 faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof. In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations/functions that may correspond to at least some of the machine readable instructions of FIGS. 3 and 4 and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 720 of FIG. 7. Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine readable instructions represented by the flowchart(s) of FIGS. 3 and 4 to perform first operation(s)/function(s), the FPGA circuitry 800 of FIG. 8 may be configured and/or structured to perform second operation(s)/function(s) corresponding to a second portion of the machine readable instructions represented by the flowcharts of FIGS. 3 and 4, and/or an ASIC may be configured and/or structured to perform third operation(s)/function(s) corresponding to a third portion of the machine readable instructions represented by the flowcharts of FIGS. 3 and 4.

It should be understood that some or all of the circuitry of FIG. 2 may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 700 of FIG. 7 may execute machine readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry of FIG. 2 may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

Figure 9:
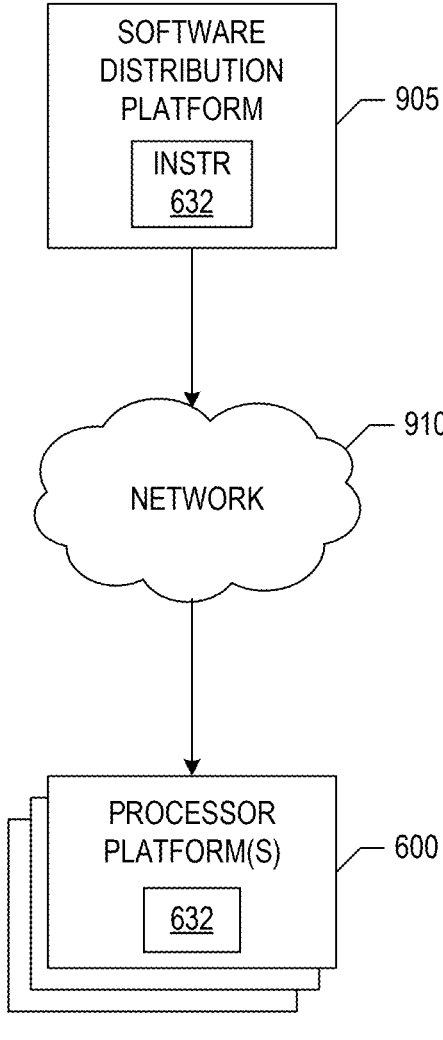
FIG. 9 is a block diagram of an example software/firmware/instructions distribution platform (e.g., one or more servers) to distribute software, instructions, and/or firmware (e.g., corresponding to the example machine readable instructions of FIGS. 3 and 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to other hardware devices (e.g., hardware devices owned and/or operated by third parties from the owner and/or operator of the software distribution platform) is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions of FIGS. 3 and 4, as described above. The one or more servers of the example software distribution platform 905 are in communication with an example network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions of FIGS. 3 and 4, may be downloaded to the example programmable circuitry platform 600, which is to execute the machine readable instructions 632 to implement the non-suspicious list generation circuitry 102. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that accelerate an analysis of emails for threat detection by ensuring only suspicious emails are analyzed by an artificial intelligence model. Disclosed systems, apparatus, articles of manufacture, and methods improve the efficiency of using a computing device by increasing reducing an amount of processing resources needed to scan and analyze emails for threat detection. Examples disclosed herein reduce the overall cost of cyber security solution systems by reducing an amount of processing resources needed, which in turn enables artificial intelligence based detection at all types of devices, including personal computing devices like smartphones, tablets, laptops, etc. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to generate a list of non-suspicious email addresses to be used by an artificial intelligence-based threat detection model that is to analyze an email for a threat, the apparatus comprising:
   interface circuitry;
   machine readable instructions; and
   programmable circuitry to at least one of instantiate or execute the machine readable instructions to:

obtain an email address from a group of email addresses to be considered as candidates for adding to the list of non-suspicious email addresses;
   determine that a domain of the email address is indicative of a non-email service providing entity;
   determine that the email address has a policy configured for a domain-based message authentication, reporting, and conformance (DMARC) record;
   add the email address associated to the list of non-suspicious email addresses; and
   cause the artificial intelligence-based threat detection model to skip an analysis of an email associated with the email address.

2. The apparatus of claim 1, wherein the email address is a first email address, and the programmable circuitry is to:
   obtain a second email address from the group of email addresses;
   determine that a domain of the second email address is indicative of an email service providing entity; and
   remove the second email address from the group of email addresses to be considered as candidates.

3. The apparatus of claim 1, wherein the programmable circuitry is to determine that the email address has a policy configured for the DMARC record when the policy is set to reject or quarantine.

4. The apparatus of claim 1, wherein the programmable circuitry is to generate a lookup table based on the list of non-suspicious email addresses.

5. The apparatus of claim 1, wherein the programmable circuitry is to append an event count to the email address after adding the email address to the list of non-suspicious email addresses, the event count to cause the programmable circuitry to reevaluate the email address after an event count has passed.

6. The apparatus of claim 1, wherein the email address is a first email address, the non-email service providing entity is a first non-email service providing entity, the DMARC record is a first DMARC record, and the programmable circuitry is to:
   obtain a second email address from the group of email addresses;
   determine that a domain of the second email address is indicative of a second non-email service providing entity;
   determine that the second email address has not configured a policy for a second DMARC record; and
   remove the second email address from the group of email addresses to be considered as candidates.

7. The apparatus of claim 6, wherein the second non-email service providing entity has validly configured the second DMARC record and a user of the second email address has not configured the policy for the second DMARC record.

8. A non-transitory machine readable storage medium to generate a list of non-suspicious email addresses to be used by an artificial intelligence-based threat detection model that is to analyze an email for a threat, the non-transitory machine readable storage medium comprising instructions to cause programmable circuitry to at least:
   obtain an email address from a group of email addresses to be considered as candidates for adding to the list of non-suspicious email addresses;
   determine that a domain of the email address is indicative of a non-email service providing entity;
   determine that the email address has a policy configured for a domain-based message authentication, reporting, and conformance (DMARC) record;

add the email address associated to the list of non-suspicious email addresses; and cause the artificial intelligence-based threat detection model to skip an analysis of an email associated with the email address.

9. The non-transitory machine readable storage medium of claim 8, wherein the email address is a first email address, and the instructions are to cause the programmable circuitry to:

obtain a second email address from the group of email addresses;

determine that a domain of the second email address is indicative of an email service providing entity; and remove the second email address from the group of email addresses to be considered as candidates.

10. The non-transitory machine readable storage medium of claim 8, wherein the instructions are to cause the programmable circuitry to determine that the email address has a policy configured for the DMARC record when the policy is set to reject or quarantine.

11. The non-transitory machine readable storage medium of claim 8, wherein the instructions are to cause the programmable circuitry to generate a lookup table based on the list of non-suspicious email addresses.

12. The non-transitory machine readable storage medium of claim 8, wherein the instructions are to cause the programmable circuitry to append an event count to the email address after adding the email address to the list of non-suspicious email addresses, the event count to cause the programmable circuitry to reevaluate the email address after an event count has passed.

13. The non-transitory machine readable storage medium of claim 8, wherein the email address is a first email address, the non-email service providing entity is a first non-email service providing entity, the DMARC record is a first DMARC record, and the instructions are to cause the programmable circuitry to:

obtain a second email address from the group of email addresses;

determine that a domain of the second email address is indicative of a second non-email service providing entity;

determine that the second email address has not configured a policy for a second DMARC record; and remove the second email address from the group of email addresses to be considered as candidates.

14. The non-transitory machine readable storage medium of claim 13, wherein the second non-email service providing entity has validly configured the second DMARC record and a user of the second email address has not configured the policy for the second DMARC record.

15. A server to distribute first software instructions on a network to generate a list of non-suspicious email addresses to be used by an artificial intelligence-based threat detection model that is to analyze an email for a threat, the server comprising:

at least one storage device including second instructions; and at least one processor to execute the second instructions to transmit the first software instructions over the network, the first software instructions, when executed, to cause at least one device to:

obtain an email address from a group of email addresses to be considered as candidates for adding to the list of non-suspicious email addresses;

determine that a domain of the email address is indicative of a non-email service providing entity;

determine that the email address has a policy configured for a domain-based message authentication, reporting, and conformance (DMARC) record;

add the email address associated to the list of non-suspicious email addresses; and cause the artificial intelligence-based threat detection model to skip an analysis of an email associated with the email address.

16. The server of claim 15, wherein the email address is a first email address and the first software instructions are to cause the at least one device to:

obtain a second email address from the group of email addresses;

determine that a domain of the second email address is indicative of an email service providing entity; and remove the second email address from the group of email addresses to be considered as candidates.

17. The server of claim 15, wherein the first software instructions are to cause the at least one device to determine that the email address has a policy configured for the DMARC record when the policy is set to reject or quarantine.

18. The server of claim 15, wherein the first software instructions are to cause the at least one device to generate a lookup table based on the list of non-suspicious email addresses.

19. The server of claim 15, wherein the first software instructions are to cause the at least one device to append an event count to the email address after adding the email address to the list of non-suspicious email addresses, the event count to cause the first software instructions to reevaluate the email address after an event count has passed.

20. The server of claim 15, wherein the email address is a first email address, the non-email service providing entity is a first non-email service providing entity, the DMARC record is a first DMARC record, and the first software instructions are to cause the at least one device to:

obtain a second email address from the group of email addresses;

determine that a domain of the second email address is indicative of a second non-email service providing entity;

determine that the second email address has not configured a policy for a second DMARC record; and remove the second email address from the group of email addresses to be considered as candidates.

* * * * *